United States Patent [19]

Wingard et al.

[11] 4,082,512

[45] Apr. 4, 1978

[54] MIXING HEAD FOR A REACTION INJECTION MOLDING MACHINE

[75] Inventors: Robert Dean Wingard; Shirley Margaret Leidal, both of Akron, Ohio

[73] Assignee: The Upjohn Company, Kalamazoo, Mich.

[21] Appl. No.: 753,465

[22] Filed: Dec. 22, 1976

[51] Int. Cl.$^2$ .................. B28B 1/50; B29D 27/00
[52] U.S. Cl. .......................... 23/252 R; 23/285; 23/252 A; 425/4 R; 260/2.5 BC; 366/76
[58] Field of Search ............... 23/252 R, 285, 252 A; 259/4 R; 425/4 R

[56] References Cited

U.S. PATENT DOCUMENTS

| 3,450,388 | 6/1969 | Stump | 23/252 R X |
| 3,799,199 | 3/1974 | Rumpff | 259/4 R X |

*Primary Examiner*—James H. Tayman, Jr.
*Attorney, Agent, or Firm*—St. Onge, Mayers, Steward & Reens

[57] ABSTRACT

A mixing head for a reaction injection molding machine, which incorporates several beneficial features, comprises a body having a bore, which defines a mixing chamber, and a plurality of nozzle orifices opening into the mixing chamber for conducting reactive polymeric components thereto. A plunger is mounted for reciprocal movement in the mixing chamber to control flow of the reactive components through the nozzle orifices to form a homogeneous polymer mix, e.g. a polyurethane or polyisocyanurate mix, in the chamber, and serves also to eject the resulting mix from the chamber. The plunger is controlled by an actuator piston and is linked thereto by a universal coupling that minimizes plunger binding in the mixing chamber due to misalignment between the plunger and actuator. The plunger is also sheathed in a sleeve of antifrictional material that permits maintaining a very tight piston fit without excessive friction, and thus resists build-up of reactive material which is a common cause of plunger "freezing" or excess wear. Flow of polymeric components through individual nozzle orifices is regulated by a restrictor valve for each component which includes a packing gland-retainer assembly as well as a position locking arrangement. Accordingly, the restrictor valve may be adjusted without leakage while the mixing head is in operation or while the polymeric composition is under pressure.

7 Claims, 8 Drawing Figures

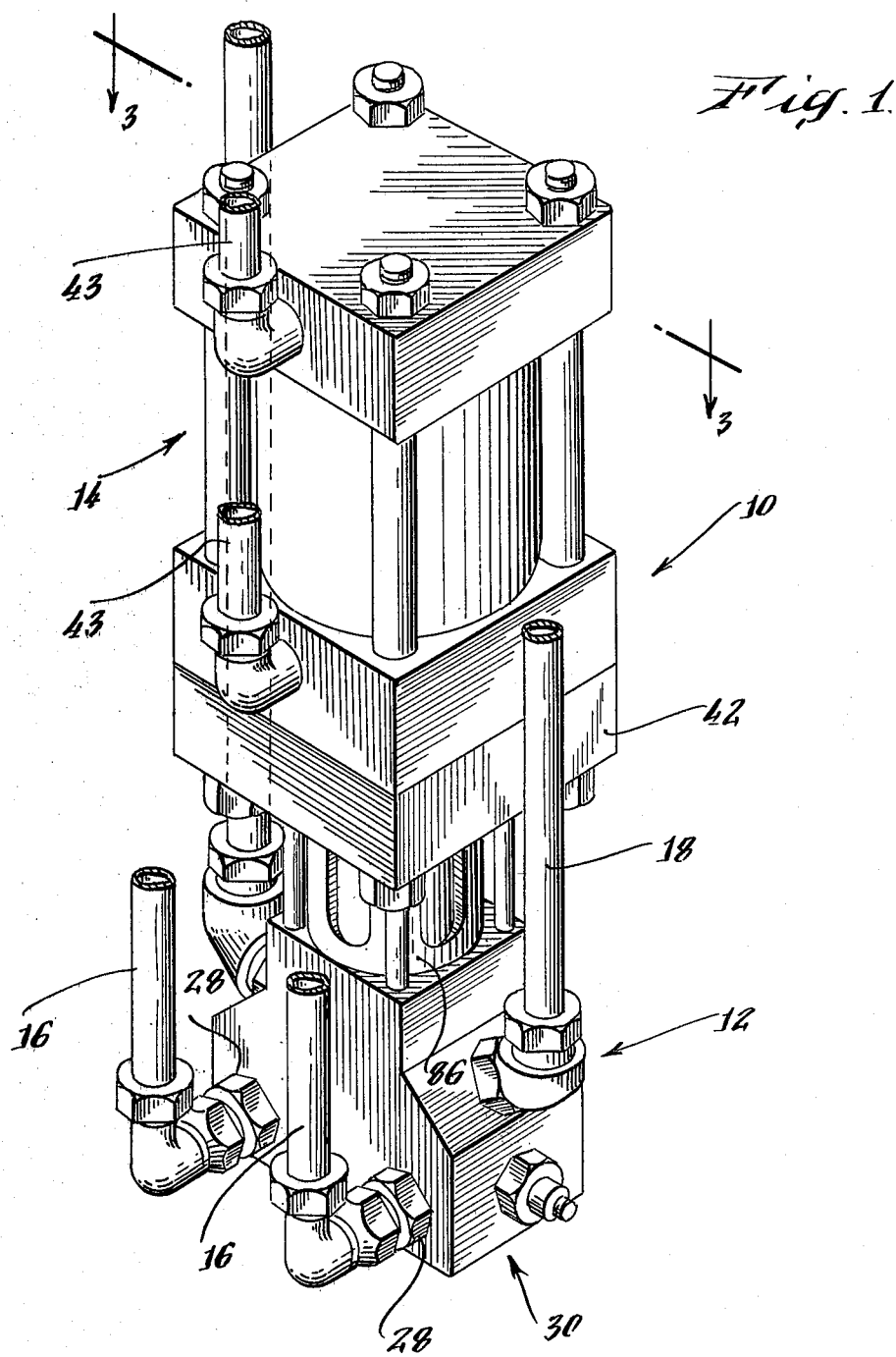

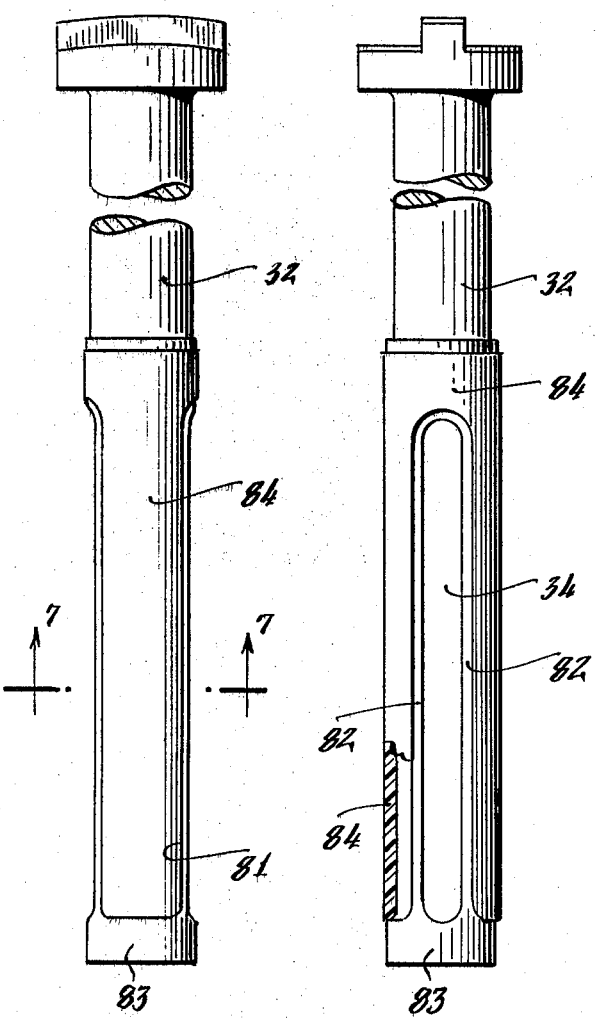
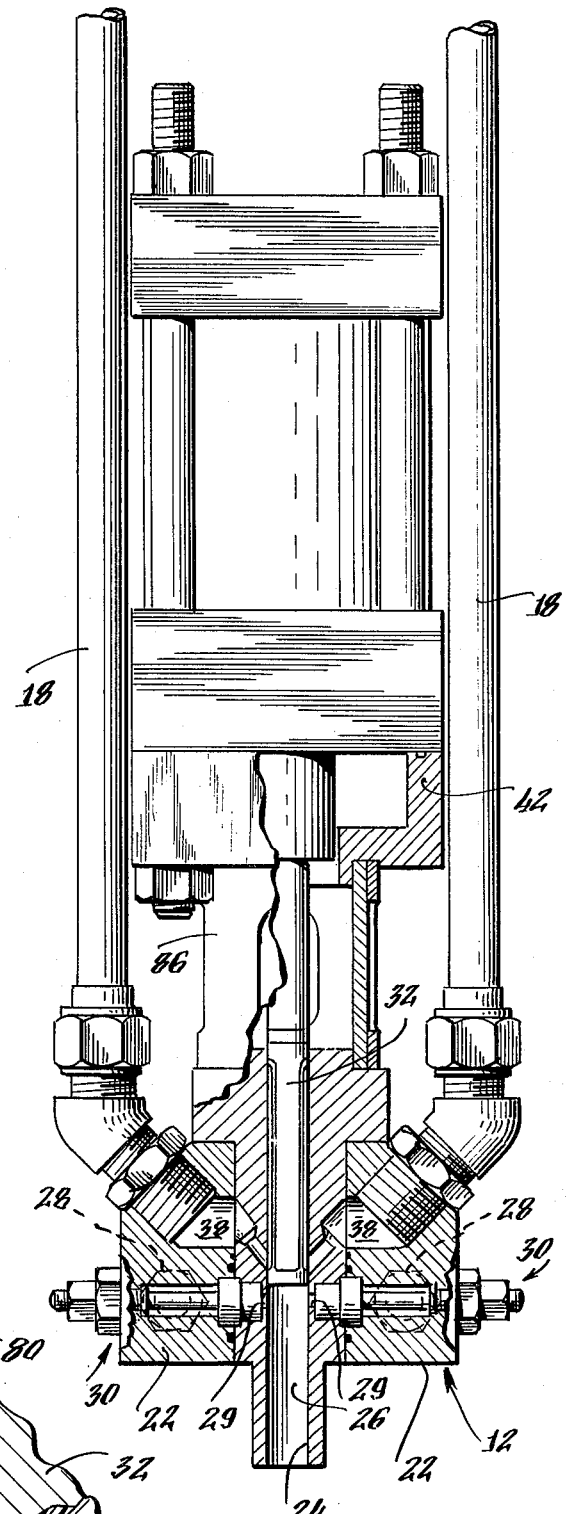

MIXING HEAD FOR A REACTION INJECTION MOLDING MACHINE

BACKGROUND OF THE INVENTION

1. Field of the Invention

The present invention relates to a mixing head for a reaction injection molding machine that mixes a plurality of reactive polymeric components for subsequent injection into a mold. The head is of the type used primarily, for example, in mixing urethane or isocyanurate polymer compositions.

Reaction injection molding, also called liquid injection molding, is a technique for combining reactive liquid polymeric components and injecting them into a mold where they rigidify to form a finished product. The component combination is achieved by directing streams of two or more reactive polymeric liquid components, each under high pressure, to cause their impingement at a common point in a mixing chamber of the mixing head. The resultant component impact creates a homogeneous mass of material in the mixing chamber which is generally then injected under pressure into a closed mold to which the mixing head is connected, or the mix may simply be dispensed into an open mold.

The reaction injection molding technique has advantages over conventional plastic foam open molding techniques in that a completely closed system is maintained for the components from withdrawal from their respective supply tanks to their injection in admixed condition into the closed mold. This totally enclosed injection molding technique permits formation of more intricate, delicate products, having narrow or thin sections that could not oridinarily be formed by conventional low pressure or open mold techniques. It also permits use of components of greater reactivity than is practical in the low pressure open mold techniques.

However, mixing heads used to combine reactive polymeric components and to inject the admixture of these components into a closed mold have exhibited certain problems.

2. Description of the Prior Art

Various forms of mixing heads for reaction injection molding machines are presently known. One typical form, disclosed, for example, in U.S. Pat. Nos. 3,706,515 (Keuerleber et al.) and 3,102,004 (Grintz); and in the British Patent Specifications 1,407,616 (Hodgson) and 1,401,752 (Krauss-Maffei Aktiengellschaft), includes a body that has a bore which defines a mixing chamber. A plurality of nozzle orifices open into the mixing chamber for conducting reactive polymeric components thereto. The orifices are ordinarily directed at a common point in the mixing chamber to effect violent impingement of each component with all others to accordingly mix the components together into a homogeneous fluid mass. Flow of all components through all nozzle orifices is simultaneously controlled by a plunger mounted for axially reciprocal movement in the mixing chamber. When the plunger is retracted into the head, the orifices in the mixing chamber are opened, permitting polymeric components to issue therefrom in the form of high velocity impinging streams.

Such mixing heads also include a plurality of return ducts each of which opens into the mixing chamber at a location axially displaced from its respective component nozzle orifice. The plunger is formed with a plurality of by-pass channels which respectively communicate, when the plunger is in a recycle position, between an adjacent nozzle orifice and return duct of each component to establish a closed loop leading back to the component supply to provide recirculation. The plunger recycle position corresponds to maximum extension in the head, that is, the extreme of reciprocal plunger travel opposite to the retracted, nozzle orifice-opening, position.

Ordinarily in reaction injection molding processes, the components are pressurized to levels which often exceed 2000 to 2400 psi. Because of this, and because of reactivity of the several components if there is leakage around the plunger, the tolerances between moving parts of the mixing head, such as those between the plunger and mixing head, must be maintained extremely close. For example, tolerances of ±0.0001 inch for the plunger and bore diameters are not uncommon. In the past, it has been found that the need for such extremely small tolerances has shortened the operational life of mixing heads because the plunger has a tendency to bind or seize in the mixing head body.

Further, the plunger is usually driven by a coaxially mounted hydraulic piston and, while not fully appreciated heretofore, because of the extremely small tolerances between the plunger and mixing head body, slight colinear misalignment between the actuating piston and the plunger may produce a tendency of the plunger to bind in the mixing head body. This also contributes to shortened operational life.

Still another problem encountered with prior art reaction injection molding machine mixing heads relates to control of the volume of polymeric component entering the mixing chamber through each nozzle orifice when these are opened. Typically, prior art apparatus employ a needle-type restrictor valve to control the flow through each nozzle orifice and, hence, the amount of polymeric component which issues from it when it is open. However, again because of the high pressures at which such apparatus operate, these restrictor valves tended to leak if adjustment is attempted while the component is under injection pressure.

The mixing head for the reaction injection molding machine of the present invention has been designed to minimize the problems noted above.

SUMMARY OF THE INVENTION

In a preferred embodiment, to be described below in detail, the mixing head of the present invention for a reaction injection molding machine incorporates features for significantly extending its operational life by minimizing the tendency of the component flow controlling plunger to seize or bind in the mixing head body. In its preferred embodiment, the mixing head also includes a restrictor valve seal arrangement which permits each polymeric component restrictor valve to be adjusted without substantial leakage while the mixing head is in operation or while the component is under high pressure.

The mixing head of the present invention comprises a machined metal body which defines a mixing chamber and a plurality of nozzle orifices opening into the mixing chamber. Each of the orifices is in communication with one component supply. A carefully machined metal plunger is mounted in the mixing chamber for axial reciprocal movement and is driven by an actuating piston between the nozzle orifice opening position and admixture ejecting, or recycle, position.

Binding of the plunger in the mixing head body which, it has been discovered, resulted in prior apparatus from non-colinearity of the axis of the actuating piston and the plunger is eliminated in the present invention by interposing a universal coupling between the plunger and actuating piston. Moreover, seizing of the plunger in the mixing head body has been further minimized by sheathing most of the plunger surface in a sleeve of antifriction material. The plunger is formed to prevent this sleeve from flowing or otherwise being squeezed into the plunger by-pass channels which interconnect axially adjacent nozzle orifices and return ducts by machining the plunger wall surrounding the by-pass channels to form depressed regions for receiving the antifriction sleeve, yet leaving peripherally continuous metal lands surrounding the respective channels to provide the necessary structural restraint for the sleeve.

The mixing head of the present invention also incorporates a restrictor valve seal arrangement which permits the restrictor valve to be adjusted while the mixing head is in operation; i.e., while the components are under high pressure. In particular, the mixing head body is formed with a threaded bore that terminates in a valve seat upstream of each nozzle orifice. A valve member, having a threaded exterior, is engaged in the threaded bore for adjustable screw-type movement relative to the valve seat to regulate component flow. The valve member is formed with an annular recess and the threaded bore is formed with an annular rabbet at its outer margin. Together, the annular recess and rabbet define a channel in which a packing seal is disposed. A gland retainer holds the packing seal in the channel so that the valve member may be adjusted without leakage. Finally, a lock nut is threaded on the outer end of the valve member and abuts the mixing head body to effect a reaction between the threaded bore and threaded valve member to lock the two in a given relative position.

Accordingly, the reaction injection molding machine mixing head of the present invention incorporates features which minimize binding and seizing of the component flow controlling plunger, and further which permit regulation of individual nozzle orifices while the mixing head is in operation or while the polymeric components are under pressure. Thus, it is an object of the present invention to provide a mixing head for a reaction injection molding machine which eliminates or minimizes these problems in prior art apparatus.

Other objects, aspects, or advantages of the present invention will be pointed out in, or will be understood from, the following detailed description provided below in conjunction with the accompanying drawings.

BRIEF DESCRIPTION OF THE DRAWINGS

FIG. 1 is a perspective view of the mixing head of the present invention for a reaction injection molding machine.

FIG. 2 is a partial, vertical cross-sectional view of the mixing head shown in FIG. 1 illustrating the mixing plunger in its retracted, nozzle orifice-opening position.

FIG. 5 is a side elevational view of the plunger used in the mixing head.

FIG. 6 is a second side elevational view of the plunger as viewed 90° from the view shown on FIG. 4.

FIG. 7 is a cross-sectional view taken through plane 7—7 in FIG. 5 showing the formation of by-pass channels and a recess in which the sleeve of antifriction material is mounted on the plunger.

FIG. 8 is a cross-sectional view similar to that shown in FIG. 7 illustrating the plunger mounted in the mixing head body.

DETAILED DESCRIPTION OF THE PREFERRED EMBODIMENTS

Figure 3:
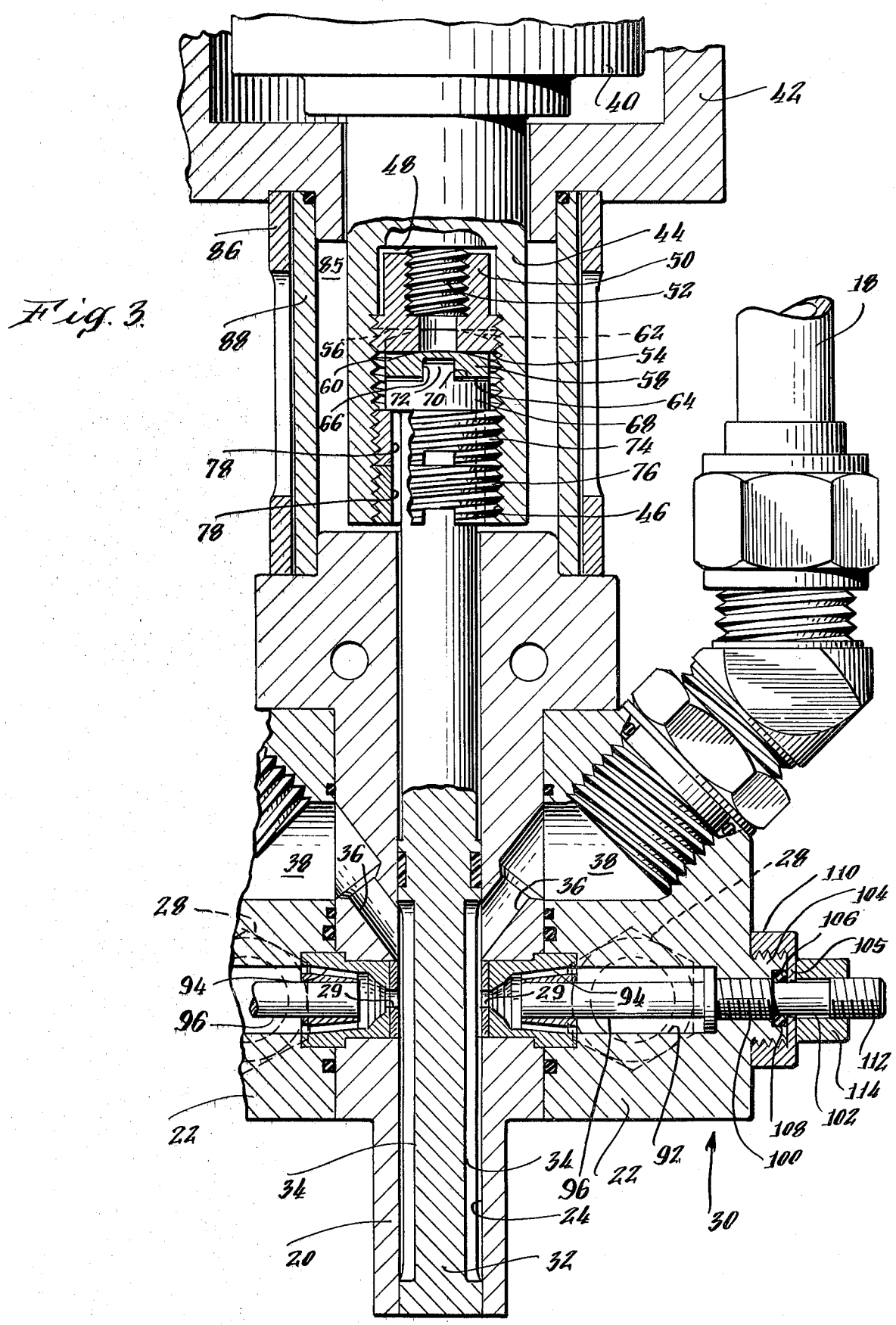
FIG. 3 is an enlarged vertical cross-sectional view, taken through plane 3—3 in FIG. 1, similar to that shown in FIG. 2, illustrating the plunger in its extended chamber clean-out and component recycle position.

FIG. 1 illustrates in perspective the mixing head of the present invention, generally indicated at 10. This mixing head includes a main body 12 that is formed from any suitable material, e.g. steel, which is capable of withstanding pressures in excess of 2500 psi. Attached to the main body is a hydraulic actuating device, generally indicated at 14, which will be described in greater detail below.

In the interest of simplicity, the illustrated mixing head is equipped to mix only two reactive polymeric components, for example polyol and isocyanate components incorporating the necessary catalysts, foaming agents, etc. However, as will be understood from the description which follows, the head may be adapted to mix more than two components merely by multiplying the number of closed component handling circuits to include conduits to and from the mixing head, and corresponding internal component ducting within the head.

Each closed component handling circuit includes a component reservoir or supply (not shown), a feed duct 16 and a return duct 18, both of which communicate with the reservoir through pumps, heat exchangers and related control components of well known type. Both ducts also communicate with the mixing head in a manner described below.

Referring now to FIG. 2, it can be seen that the main mixing head body 12 comprises a central block 20 and two side blocks 22 attached to the centrol block by any suitable means. The central block 20 is formed with a cylindrical bore 24 that defines a mixing chamber 26 which is open at its lower end. A closed mold (not shown) may be attached to the mixing head, with its mold cavity in communication with the mixing chamber, to receive a polymeric component admixture combined by the mixing head; or the mix may be discharged into an open mold.

Each of two reactive component streams is conducted to the mixing chamber 26 from one feed conduit 16 through internal ducting 28 which terminates in a nozzle orifice 29. The sizes of the nozzle orifices are controlled by restrictor valves, generally indicated at 30. As can be seen in FIGS. 2 and 3, the two nozzle orifices 29 are coaxially, diametrically opposed in mixing chamber 26. Accordingly, reactive polymeric component conducted under high pressure through one of the orifices impinges upon the component conducted through the other in the mixing chamber to create a homogeneous polymeric admixture.

Injection of the polymeric admixture from the mixing head into a mold during a "pour" cycle, or recirculation of the respective polymeric components during "recycle" condition, is controlled by a plunger 32 which is mounted for axial reciprocation in bore 24. As can be seen best in FIG. 3, the plunger 32 includes two diametrically opposed by-pass channels 34 into which each of the nozzle orifices 29 opens when the plunger is in its extended, recycle, position. At this time, each by-pass channel is also in communication with a return conduit 36 which through suitable internal and external ducting, generally indicated at 38, is connected to one of the return conduits 18. Accordingly, when the plunger is in the extended recycle position, all reactive components are returned under pressure to the component supply in a known manner. (See, for example, U.S. Pat. No. 3,706,515 Keuerleber et al.) However, when the plunger is withdrawn to its retracted position shown in FIG. 2, component may enter the mixing chamber from the respective nozzle orifices and be combined. This much of the mixing head construction is known.

As noted above, because of the high component pressures encountered in the reaction injection molding machine, the mixing head bore and plunger must be manufactured to extremely small tolerances in order to provide a tight piston fit. Also because of the chemically reactive nature of the components when in contact with each other, leakage or seepage along the plunger/cylinder surface will cause eventual build-up of reacted, polymerized material. This not only progressively interferes with proper metering of the components by the plunger, it may also result in complete inoperability of the mixing head. Thus extremely tight tolerances between the plunger and cylinder are critical. However, as mentioned, this requirement has frequently resulted in binding or seizing of the plunger in the mixing head body, sometimes after only a few cycles of reciprocal plunger movement. The present invention incorporates several features designed to substantially eliminate this problem.

As shown in the FIGURES, the plunger is driven by the actuating device 14 which may be a double-acting hydraulic piston mounted for corresponding reciprocation in a cylinder 42. The piston is operated by hydraulic fluid selectively conducted to either of its sides through supply conduits 43 (FIG. 1) in a well known manner. It has now been discovered that one cause of plunger-mixing head binding can be due to slight non-colinearity of the axes of the plunger and actuating piston. Because the respective parts of the mixing head apparatus are precision machined to close tolerances and, therefore, small deviations from colinearity of the respective axes are difficult to observe, this cause of the binding problem is not readily apparent and has apparently not been appreciated heretofore. The present invention accordingly incorporates a universal coupling which permits a limited amount of axial flexing between the plunger and actuating piston during reciprocal movement to accommodate such minor misalignment.

Figure 4:
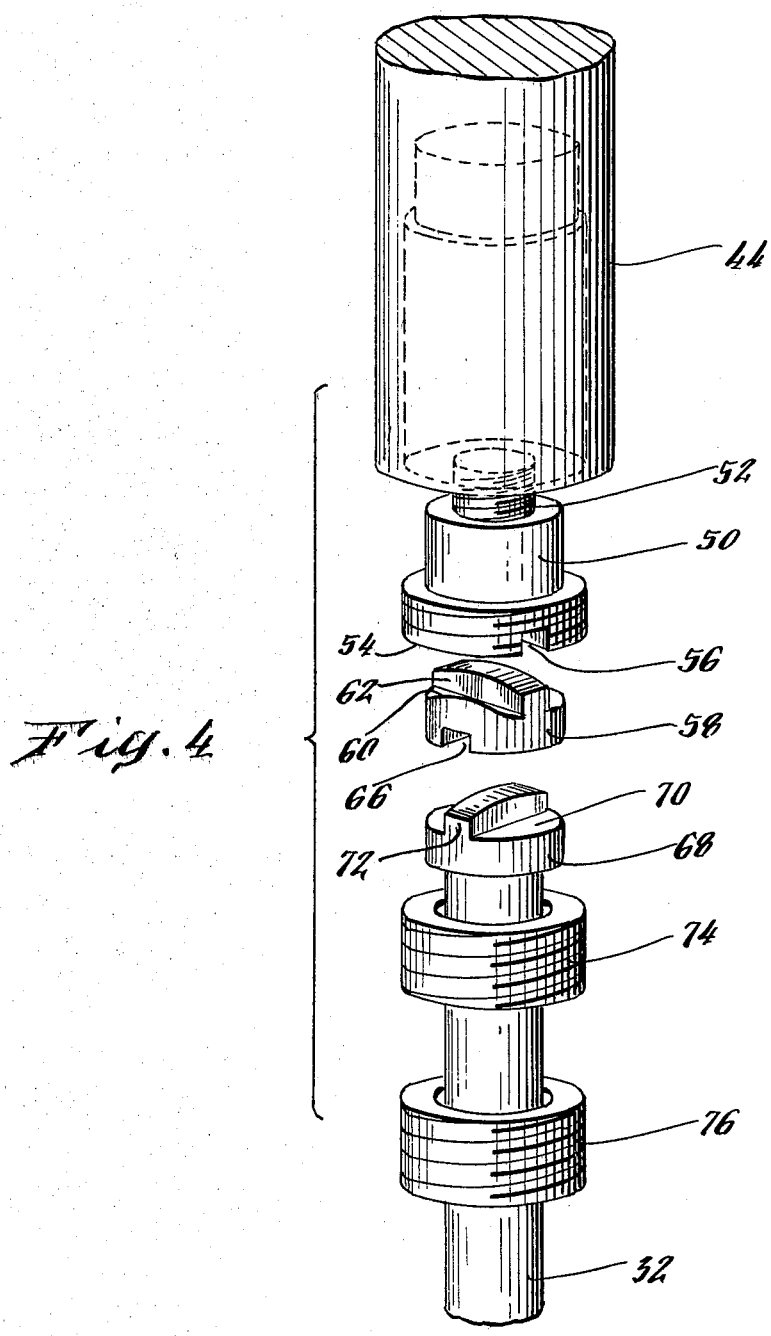
FIG. 4 is an exploded perspective view of the universal coupling between the plunger and actuating piston.

The coupling is best shown in FIGS. 3 and 4 and includes an elongated tubular socket member 44 projecting from the base of actuating piston 40. This member is internally threaded at 46. An alignment plug 50 is threaded into the socket and is equipped with a set screw 52 for adjusting the distance between it and the internal base 48 of the socket to give longitudinal adjustability of the positioning of the plunger in the head.

Alignment plug 50 is formed with a planar front face 54 having a diametrically disposed groove 56. An alignment disc 58 is mated with the alignment plug 50 and includes a slightly arcuate rear face 60 and a diametrically disposed tongue 62 which is received in the groove 56. The tongue 62 also has an arcuate face congruent to that of rear face 60 of the disc. Accordingly, the alignment disc may be rocked on its arcuate face against the planar front face of the alignment plug 50.

The front face 64 of the alignment disc 58 is also planar and is formed with a diametrically disposed groove 66. However, the disc groove 66 is disposed 90° with respect to the tongue 62.

The plunger is formed at its inner end with a flange-like cap 68 which also has an arcuate rear face 70 and a tongue 72 formed therewith having an arcuate surface. The tongue 72 mates with the alignment disc groove 66. Therefore, a limited degree of rocking movement can be accommodated between the plunger and the alignment disc. However, this rocking movement is in a plane disposed at right angles to the plane of rocking movement between the disc and the alignment plug. Accordingly, the plunger axis may flex universally to a limited degree relative to the piston and thus accommodate slight colinear misalignment between actuator cylinder 42 and bore 24 of the mixing head, reducing any tendency for binding of the plunger on that account.

The respective parts of the coupling described above are held in place by two retaining rings 74 and 76 threaded into the socket 44. These rings are each provided with an internal bore 78 which has a diameter larger than the principal diameter of the plunger 32, but smaller than the diameter of the plunger cap 68. Accordingly, retaining ring 74 abuts the front of the plunger cap to hold it, along with the alignment disc, in the socket. The second retaining ring 76 is locked against the first ring 74 to prevent their disengagement from the socket 44.

The high pressure mixing head described above also incorporates another feature designed to prevent plunger binding or seizing. That is best described with reference to FIGS. 5 through 8. In particular, the outer surface of the plunger is formed with a recess 80 that completely encompasses the plunger intermediate its length and extends axially downwardly to form elongate fingers 81 that lie between and are axially coextensive with the by-pass channels 34. Recess 80 is milled in the plunger so as to leave lands 82 which peripherally enclose channels 34 and meld into a circumferential land 83 at the free end of the plunger. (See FIG. 5.) A sleeve of antifriction material 84 is suitably secured in the plunger recess, as by cementing, so as to provide a major portion of the plunger surface, yet be supported laterally of the recess by the lands 82, 83 which prevent extrusion or flow under pressure into the by-pass grooves or endwise of the free end of the plunger. The nature of the anti-friction material is of some criticality. It has been found that a material sold under the trademark "RULON" by Dixon Corporation, Bristol, Rhode Island, is well suited for this purpose. Such material is described in U.S. Pat. Nos.: Re. 26,088 and 3,652,409 assigned to that company. In general it is a composite consisting of a homogeneous mixture of three components comprising (a) polytetrafluoroethylene (PTFE); (b) a silicate such as glass, talc, mica or aluminum silicate; and (c) a metallic particulate of a metal such as molybdenum, copper, lead or silver. Additional information on several forms of the product is given in a Dixon Corporation catalog entitled "Design Engineering Manual 101." Another material useful as a possible equivalent comprises a homopolymer of p-oxybenzoyl repeat units, sold under the trade name "Ekanol" by the Carborundum Company, Niagra Falls, N.Y., in combination with PTFE (polytetrafluoroethylene) polymer and glass fiber.

Accordingly, the flexible coupling and the antifriction sleeve incorporated in the mixing head of the present invention cooperate to minimize the causes of binding between plunger and the mixing head body previously encountered in prior art reaction injection molding machines.

The mixing head of the present invention also includes a feature associated with the universal coupling which permits easy detection if leakage of any of the polymer components developes around the plunger. This feature comprises a high pressure-resistant, transparent cylinder 88 disposed in a cage 86 which encircle the socket and flexible coupling 44 and define an annular chamber 85 visible through the openings in the cage. This chamber is filled with a liquid chosen to be non-reactive with the polymeric components but which is of such transparency that trace amounts of components leaking into it will be apparent due to discoloration. This will then be observable by the machine operation, and corrective action can be promptly taken.

As shown in FIG. 3, the mixing head of the present invention incorporates two improved restrictor valve assemblies 30 which permit adjustment of the size of each nozzle orifice 29 while a pressurized component is fed in the respective circuit. Each restrictor valve assembly is mounted in a cylindrical cavity 92 formed in one of the side blocks 22 of the mixing head body 12. A conical valve seat 94 of hardened material such as stainless steel is mounted between the central and side blocks 20 and 22, respectively, and this actually defines the nozzle orifice 29. A valve element 96 is mounted for axial reciprocal movement in the chamber 92 toward and away from the valve seat, by being threaded into a complementary bore 100, to regulate the restriction imposed in the orifice.

The valve member is formed with an annular recess 102 in the stem near its outer end. Similarly, the side block 22 is formed with a threaded boss 104 having an annular rabbet 106 at its outer end. Together the recess 102 and rabbet 106 define a toroidal channel in which a packing gland in the form of an O-ring seal 108 is mounted to form a pressure tight joint. The O-ring 108 is retained in place by an overcap 110 screwed down over the cylindrical boss 104 which has an aperture for receiving the outwardly projecting end of the valve member and a radially inwardly directed flange 105 that actually retains the O-ring. Adjustment of the restrictor valve setting may be accomplished by turning it in or out of the threaded bore 100 to move its valving end 111 closer to or farther away from valve seat 94 without disturbing the sealing effect of the O-ring. A locking arrangement is provided, and in particular the valve member's outer end is threaded at 112 and a lock nut 114 is threaded over it to react against the outer face of retainer nut 110. Thus, once the valve member is properly positioned, lock nut 114 is tightened down against the retainer nut 110 to hold the valve member in place.

Accordingly, the reaction injection molding machine of the present invention incorporates a restrictor valve seal which permits adjustment while the machine is in operation, i.e. while the polymeric component is pressurized against it, yet maintains a leak-proof seal at all times.

Although specific embodiments of features of a reaction injection molding machine have been described above in detail, it is to be understood that this is for purposes of illustration. Modifications may be made to the described structures by those skilled in the art in order to adapt these features to particular applications.

What is claimed is:

1. In a mixing head for a reaction injection molding machine, which includes a metal block defining a bore constituting a mixing chamber, a plurality of nozzle orifices in said block opening radially into the mixing chamber, and a metal plunger received in said bore and having a plunger surface that complements said bore, at least a portion of which makes a piston fit therewith, actuating means connected to one end of said plunger for reciprocating it between a retracted position wherein the free end of the plunger is withdrawn past said orifices to permit reactive liquid polymeric components simultaneously to enter the mixing chamber, and an extended position wherein the plunger blocks said orifices while the free end of the plunger ejects mixed components from said mixing chamber, said plunger having axially oriented by-pass channels in its surface, one each cooperating respectively with a respective nozzle orifice; the improvement comprising:

the surface of said metal plunger being formed with a first recess portion completely encompassing said plunger intermediate its ends and each of a plurality of remaining portions of said recess, equal in number to the number of by-pass channels, extending axially from said first portion and lying between adjacent by-pass channels, said recess thereby defining a narrow land peripherally surrounding each by-pass channel and a land completely encircling the free end of said plunger; and an antifriction, cured, polymeric-base, inorganic particulate-reinforced material disposed in the recess of the plunger surface and constituting a sleeve forming the major bearing surface of the plunger in contact with the wall of the bore, said polymeric-base material sleeve defining a plunger diameter slightly larger than the diameter of said bore prior to insertion therein but being compressed by insertion into said bore to form a close sliding seal with the wall thereof, said sleeve further being restrained against pressure-induced flow into said by-pass channels and axially of the free end of the plunger by said metal lands.

2. The improvement in a reaction injection molding machine as defined in claim 1, wherein said antifriction material is a homogeneous composition of polytetrafluoroethylene, and metallic and silicate particulates.

3. The improvement in a reaction injection molding machine as defined in claim 1, wherein said sleeve of antifriction material completely encircles said plunger intermediate its ends at a point axially beyond said by-pass channels.

4. The improvement in a reaction injection molding machine as defined in claim 1, wherein said sleeve of antifriction material is cemented in said plunger recess.

5. A mixing head for a reaction injection molding machine comprising:

A. a metal body having
  1. an elongated inner bore defining a mixing chamber,
  2. a plurality of nozzle orifices opening radially into said mixing chamber,
  3. a plurality of outlet conduits equal to the plurality of orifices, each outlet conduit being spaced axially from its respective orifice;

B. a plunger mounted for reciprocal movement in said mixing chamber between component recycle and component admixture ejection positions, said plunger having
a. a plurality of by-pass channels, each channel interconnecting one orifice and one conduit when said plunger is in the recycle position,
b. a plunger surface that complements said bore, at least a portion of which makes a piston fit therewith;

said plunger surface being formed with a recess that covers a major portion thereof, a first portion of said recess completely encompassing said plunger intermediate its ends and each of a plurality of remaining portions of said recess, equal in number to the number of by-pass channels, extending axially from said first portion and lying between adjacent by-pass channels, said recess thereby defining a narrow land of metal peripherally surrounding each by-pass channel and a land completely encircling the free end of said plunger; and C. an antifriction, cured, polymeric-base, inorganic particulate-reinforced material disposed in the recess of the plunger surface and constituting a sleeve forming the major bearing surface of the plunger in contact with said mixing chamber, said polymeric base material sleeve defining a plunger diameter slightly larger than the diameter of said mixing chamber prior to insertion therein but being compressed by insertion into said mixing chamber to form a close sliding seal with the wall thereof, said sleeve further being restrained against pressure-induced flow into said by-pass channels and axially of the free end of the plunger by said metal lands.

6. The mixing head for a reaction injection molding machine as claimed in claim 5, wherein at least a portion of said sleeve completely encompasses said plunger intermediate its ends.

7. The mixing head for a reaction injection molding machine as claimed in claim 5, wherein said sleeve is wrapped on said plunger and is secured to said plunger by cementing it in said recess.

* * * * *